(12) United States Patent
DeWitt

(10) Patent No.: US 12,222,996 B2
(45) Date of Patent: Feb. 11, 2025

(54) METHODS AND APPARATUSES FOR ASSISTING THE PRODUCTION OF MEDIA WORKS AND THE LIKE

(71) Applicant: Thomas Majchrowski & Associates, Inc., Irvine, CA (US)

(72) Inventor: Keri DeWitt, Irvine, CA (US)

(73) Assignee: Thomas Majchrowski & Associates, Inc., Irvine, CA (US)

( * ) Notice: Subject to any disclaimer, the term of this patent is extended or adjusted under 35 U.S.C. 154(b) by 0 days.

(21) Appl. No.: 18/299,143

(22) Filed: Apr. 12, 2023

(65) Prior Publication Data

US 2023/0325445 A1    Oct. 12, 2023

Related U.S. Application Data

(63) Continuation of application No. 16/234,125, filed on Dec. 27, 2018, now Pat. No. 11,657,103, which is a (Continued)

(51) Int. Cl.
*G06F 16/951* (2019.01)
*G06F 16/40* (2019.01)
(Continued)

(52) U.S. Cl.
CPC ............ *G06F 16/951* (2019.01); *G06F 16/43* (2019.01); *G06F 16/48* (2019.01); *G06F 16/489* (2019.01);
(Continued)

(58) Field of Classification Search
CPC ........ G06F 16/951; G06F 16/43; G06F 16/58; G06F 16/71; G06F 16/78; G06F 16/40
See application file for complete search history.

(56) References Cited

U.S. PATENT DOCUMENTS 5,610,841 A    3/1997    Tanaka et al.
5,835,667 A    11/1998   Wactlar et al.
(Continued)

FOREIGN PATENT DOCUMENTS

EP    0909089 A1    4/1999
WO    2002084638 A1    10/2002

OTHER PUBLICATIONS

International Search Report dated Sep. 28, 2006 in International Application No. PCT/US2006/004987, filed Feb. 13, 2006, published on Aug. 24, 2006 as WO2006/088780A3 (2 pages).
(Continued)

*Primary Examiner* — Dangelino N Gortayo
(74) *Attorney, Agent, or Firm* — Brooks Kushman P.C.

(57) ABSTRACT

Systems and methods for assisting one or more users in the production of a media work from a plurality of recordings are disclosed. In an exemplary embodiment, digital versions of the recordings are stored on a file-storage server accessible over a communications network. A media-library server provides an organized way for users to access and view the digital versions, and to associate various data files with the digital versions, such as transcription files, logging files, and storyboard documents. The exemplary media library generates web pages that enable users to search and access the digital versions from an internet browser running on a conventional personal computer. The browser also enables users to view the digital versions with a browser-compatible media viewer.

1 Claim, 12 Drawing Sheets

Related U.S. Application Data continuation of application No. 14/452,091, filed on Aug. 5, 2014, now Pat. No. 10,210,254, which is a continuation of application No. 13/604,219, filed on Sep. 5, 2012, now Pat. No. 8,819,087, which is a continuation of application No. 11/816,085, filed as application No. PCT/US2006/004987 on Feb. 13, 2006, now abandoned.

(60) Provisional application No. 60/652,455, filed on Feb. 12, 2005.

(51) Int. Cl.

| | | |
|---|---|---|
| *G06F 16/43* | (2019.01) | |
| *G06F 16/48* | (2019.01) | |
| *G06F 16/58* | (2019.01) | |
| *G06F 16/71* | (2019.01) | |
| *G06F 16/78* | (2019.01) | |
| *G11B 27/034* | (2006.01) | |
| *H04L 65/75* | (2022.01) | |

(52) U.S. Cl.
CPC .............. *G06F 16/58* (2019.01); *G06F 16/71* (2019.01); *G06F 16/78* (2019.01); *G11B 27/034* (2013.01); *H04L 65/75* (2022.05); *G06F 16/40* (2019.01)

(56) References Cited

U.S. PATENT DOCUMENTS

| | | | |
|---|---|---|---|
| 6,035,323 A * | 3/2000 | Narayen | ................. H04L 67/02 |
| | | | 709/201 |
| RE37,342 E | 8/2001 | Washino et al. | |
| 6,311,189 B1 | 10/2001 | Devries et al. | |
| 6,476,826 B1 | 11/2002 | Piotkin et al. | |
| 6,571,246 B1 | 5/2003 | Anderson et al. | |
| 6,747,706 B1 * | 6/2004 | Geddes | ................. H04H 60/07 |
| | | | 725/116 |
| 6,813,745 B1 | 11/2004 | Duncombe | |
| 6,873,877 B1 | 3/2005 | Tobias et al. | |
| 6,892,193 B2 | 5/2005 | Bolle et al. | |
| 6,959,327 B1 * | 10/2005 | Vogl | ........................ H04L 67/61 |
| | | | 725/94 |
| 6,961,954 B1 | 11/2005 | Maybury et al. | |
| 6,993,535 B2 | 1/2006 | Bolle et al. | |
| 7,039,643 B2 | 5/2006 | Sena et al. | |
| 7,110,664 B2 | 9/2006 | Yokeshwar et al. | |
| 7,191,193 B2 | 3/2007 | Ben-Yaacov et al. | |
| 7,231,351 B1 | 6/2007 | Griggs | |
| 7,269,585 B1 | 9/2007 | Burke | |
| 7,389,181 B2 | 6/2008 | Meadow et al. | |
| 7,460,148 B1 | 12/2008 | Clark et al. | |
| 7,587,446 B1 * | 9/2009 | Onyon | ................ H04L 67/1095 |
| | | | 709/217 |
| 7,590,997 B2 | 9/2009 | Diaz Perez | |
| 7,689,585 B2 | 3/2010 | Zeng et al. | |
| 7,689,619 B2 | 3/2010 | Kisliakov | |
| 7,739,583 B2 | 6/2010 | Barrus et al. | |
| 8,682,672 B1 | 3/2014 | Ha et al. | |
| 2001/0034734 A1 * | 10/2001 | Whitley | ................. G06Q 10/06 |
| 2002/0059303 A1 | 5/2002 | Ohmori et al. | |
| 2002/0111968 A1 | 8/2002 | Ching et al. | |
| 2003/0122860 A1 | 7/2003 | Ino | |
| 2004/0025180 A1 | 2/2004 | Begeja et al. | |
| 2004/0073536 A1 | 4/2004 | Smith-Semedo et al. | |
| 2004/0095376 A1 | 5/2004 | Graham et al. | |
| 2005/0078940 A1 | 4/2005 | Wakita et al. | |
| 2005/0216443 A1 | 9/2005 | Morton et al. | |
| 2006/0080741 A1 | 4/2006 | Nair | |
| 2006/0106885 A1 | 5/2006 | Blumenau et al. | |
| 2006/0195614 A1 | 8/2006 | Sena et al. | |

OTHER PUBLICATIONS

International Preliminary Report on Patentability dated Aug. 14, 2007, including th3e Written Opinion of the International Searching Authority dated Sep. 3, 2006 (4 pages).

* cited by examiner

Recording Identifier: [RestaurantScene1]  Bar-Code Data: [123456789]
File Storage Location: [\\FileStorageID\DigitalVersionsDirectory]
Media Type: [Analog Beta SP]
Input Port:  ☒MR1  ☐MR2  ☐MR3  ☐MR4
Video Format: [NTSC MPEG-2]  Resolution: [720 x 480]
Audio Format: [MPEG Layer-2]  Sample/Bit Rate: [44.1 kHz - Stereo]
Sub-clips: ☒Yes ☐No
  Criteria: ☒Scene Change  ☒Time-Code Breaks
    ☐Intervals of [  ]Minutes.

Notify upon completion of intake:

| All Production Crew<br>Lisa Appleton | ←Add | All Production Crew (e-mail Group)<br>Field Producers (e-mail Group)<br>Story Writers (e-mail Group)<br>Lisa Appleton (Individual)<br>Joel Birnbaum (Individual) |

Request Transcript/Log:
  ☒Transcript and Log  ☐Transcript only  ☐Log only
Send to:

| ABC Transcriptions | ←Add | ABC Transcriptions (Vendor)<br>XYZ Transcriptions (Vendor)<br>In House Team (e-mail Group)<br>Joel Birnbaum (Individual)<br>Karen Lee (Individual) |

Intake Started by: [Jeff Dutton]    [Click to Start Intake]

*FIG. 2*

| Recording Identifier: RestaurantScene1 | | Bar Code: 123456789 |
|---|---|---|
| Media Type: Analog Beta SP | | |
| Access History Table: | | |
| Date | Action | User |
| 11/20/2004 1:15 PM | Intake Started | Jeff Dutton |
| 11/20/2004 4:05 PM | Checked In | Lisa Appleton |

*FIG. 3A*

| Recording Identifier: RestaurantScene1 | | Bar Code: 123456789 |
|---|---|---|
| Media Type: Beta SP | Location: Cabinet A3 | |
| Access History Table: | | |
| Date | Action | User |
| 11/20/2004 1:15 PM | Intake Started | Jeff Dutton |
| 11/20/2004 4:05 PM | Checked In | Lisa Appleton |
| 12/18/2004 9:45 AM | Checked Out | Ben Carter |

*FIG. 3B*

Asset Library Record

Recording Identifier: RestaurantScene1
  Asset Type: Video
  Media Type: Analog Beta SP
  Media Bar Code: 123456789    Status: Checked Out    Access History
  Record Created: 11/20/2004

Segment Title: Visit to the Java Cafe
  Tape Name: First Tape of Shooting at Java Cafe
  Producer: Joel Birnbaum
  Field Producer: Janet Fielding
  Camera/Crew: Wayne Goodman
  Shoot Location: Joe's Java Cafe
  Shoot Date: 11/19/2004

Primary Documents:
  Digital Version Link: \\FileStorageID\DigitalVersionsDirectory\RestaurantScene1.mpg
    Version Type: NTSC MPEG-2, 720 x 480, Audio MPEG Layer-2 44.1 kHz Sub-clip Links:    \\FileStorageID\DigitalVersionsDirectory\RestaurantScene1_001.mpg
                     \\FileStorageID\DigitalVersionsDirectory\RestaurantScene1_002.mpg
                     \\FileStorageID\DigitalVersionsDirectory\RestaurantScene1_003.mpg Transcript/Log Link: \\FileStorageID\TranscriptsDirectory\RestaurantScene1_trans.doc Production Notes Links: \\FileStorageID\ProdNotesDirectory\RestaurantScene1_notes.doc

Secondary Documents:
  BestPartsofResturantScene.doc  (Author: Janet Fielding)

[Click to Edit This Page]

*FIG. 4A*

Edit Asset Library Record

Recording Identifier: RestaurantScene1
  Asset Type: Video
  Media Type: Analog Beta SP
  Media Bar Code: 123456789   Status: Checked Out   Access History
  Record Created: 11/20/2004

Segment Title: [Visit to the Java Cafe]
Tape Name: [First Tape of Shooting at Java Cafe]
Producer: [Joel Birnbaum]
Field Producer: [Janet Fielding]
Camera/Crew: [Wayne Goodman]
Shoot Location: [Joe's Java Cafe]
Shoot Date: [11/19/2004]

Primary Documents:
  Digital Version Link: \\FileStorageID\DigitalVersionsDirectory\RestaurantScene1.mpg
    Version Type: NTSC MPEG-2, 720 x 480, Audio MPEG Layer-2 44.1 kHz Sub Clips Links: \\FileStorageID\DigitalVersionsDirectory\RestaurantScene1_001.mpg
                   \\FileStorageID\DigitalVersionsDirectory\RestaurantScene1_002.mpg
                   \\FileStorageID\DigitalVersionsDirectory\RestaurantScene1_003.mpg Transcript/Log Link: \\FileStorageID\TranscriptsDirectory\RestaurantScene1_trans.doc Production Notes Links:
    [\\FileStorageID\ProdNotesDirectory\RestaurantScene1_notes.doc]   [Browse Files]
    [                                                               ]   [Upload File]

Secondary Documents:
    [\\FileStorageID\SecondaryDocs\RestaurantScene1\BestParts.doc]   [Browse Files]
    [                                                             ]   [Upload File]

[Click to Save Changes]   [Cancel]

*FIG. 4B*

Project Access Page  Today's Date 11/28/2004

Project Title: Trip to the Big City – Third Episode

News:
 Today's message from the Producer
 Shoot Schedule for today
 Today's e-daily

Media Assets:
Selection Criterion: Most recently added.

| Recording Identifier | Segment Title | Shoot Date |
|---|---|---|
| RestaurantScene1 | Visit to the Java Cafe | 11/19/2004 |
| RestaurantScene2 | Visit to the Java Cafe | 11/19/2004 |
| RestaurantScene3 | Visit to the Java Cafe | 11/19/2004 |
| ShoppingScene1 | Shopping at the Promenade | 11/19/2004 |
| ShoppingScene2 | Shopping at the Promenade | 11/19/2004 |
| ShoppingScene3 | Shopping at the Promenade | 11/19/2004 |
| TaxiScene | Taxi Ride to the Promenade | 11/19/2004 |
| HotelLobbyScene | Hotel Lobby Scene | 11/19/2004 |
| NightClubCamera1Scene1 | Visit to Club 365 | 11/18/2004 |
| NightClubCamera2Scene1 | Visit to Club 365 | 11/18/2004 |
| More... | | |

Search Media Assets by Keyword: [_____] [GO]

Search Transcripts, Logs, and Documents: [_____] [GO]

View Media Assets –
 By Segment Title
 By Tape Name
 By Status
 By Bar Code
 By Schedule (Shoot Dates)

*FIG. 5A*

Project Access Page   Today's Date 11/28/2004

Project Title: Trip to the Big City – Third Episode

News:
   Today's message from the Producer
   Shoot Schedule for today
   Today's e-daily

Media Assets:
Selection Criterion: promenade. (Back to Most recently added)

| Recording Identifier | Segment Title | Shoot Date |
|---|---|---|
| ShoppingScene1 | Shopping at the Promenade | 11/19/2004 |
| ShoppingScene2 | Shopping at the Promenade | 11/19/2004 |
| ShoppingScene3 | Shopping at the Promenade | 11/19/2004 |
| TaxiScene | Taxi Ride to the Promenade | 11/19/2004 |
| PromenadeBckgnd1 | Background shots at the Promenade | 10/07/2004 |

Search Media Assets by Keyword: [_____] [GO]

Search Transcripts, Logs, and Documents: [_____] [GO]

View Media Assets —
   By Segment Title
   By Tape Name
   By Status
   By Bar Code
   By Schedule (Shoot Dates)

*FIG. 5B*

METHODS AND APPARATUSES FOR ASSISTING THE PRODUCTION OF MEDIA WORKS AND THE LIKE

CROSS-REFERENCE TO RELATED APPLICATIONS

This application is a continuation of U.S. application Ser. No. 16/234,125, filed Dec. 27, 2018, now U.S. Pat. No. 11,657,103 which is a continuation of U.S. application Ser. No. 14/452,091 filed Aug. 5, 2014; now U.S. Pat. No. 10,210,254, issued Feb. 19, 2019, which is a continuation of U.S. application Ser. No. 13/604,219 filed Sep. 5, 2012, now U.S. Pat. No. 8,819,087 issued Aug. 26, 2014; which is a continuation of U.S. application Ser. No. 11/816,085 filed May 23, 2008; which is a 371 of International Application No. PCT/US2006/004987 filed Feb. 13, 2006; which claims the benefit of U.S. Provisional Application No. 60/652,455 dated Feb. 12, 2005; all of which are incorporated herein by reference.

TECHNICAL FIELD

The present invention relates to methods and apparatuses for assisting users in the production of media works and the like from a plurality of recordings and other content assets.

BACKGROUND

The entertainment industry has developed a new genre of movie/television entertainment called "Reality TV," or "unscripted programming." In this genre, untrained actors are placed in various settings with general direction and rules to guide their interactions, but without a specific script for actions or dialog. Beforehand, the production staff has a general idea of the storyline for the production, but the final storyline will depend upon the interactions that take place. Several video cameras are located within the settings and record the interactions among the actors for long periods of time. Various stimuli may be introduced into the settings by the production staff to provoke unpredictable interactions among the actors. After several settings have been videotaped for several hours over several days by several cameras, the production staff reviews hundreds to thousands of hours of videotape and constructs a final storyline for the TV production (i.e., media work).

In a typical production, the raw video material is reviewed by several people, typically in the range of 10 to 50, each doing a specific task, such as logging, transcribing, scanning for story points, story writing, and setting creative directions. To review raw video material, each of the hundreds of videotapes is duplicated several times, and the duplicates are distributed among the production staff. The large number of tapes has, however, created several problems that hamper and delay the production, and that increase the need for additional staffing to manage the distribution of duplicate tapes. As a first problem, the duplication of the videotapes requires time and expensive duplicating equipment. This has created a significant bottleneck in getting the video material to the production staff. As a second problem, the task of duplicating tens to hundreds of tapes as quickly as possible often creates a haphazard work environment where the original tapes and duplicates can be misplaced, lost, mislabeled, mixed up, and/or stolen. As a third problem, the large volume of duplicate tapes complicates the tape management and distribution process, and often leads to the failure to distribute duplicate tapes to key staff production persons for transcription, logging, and storyline development. As a fourth problem, the large volume of video material has made it difficult for the production staff to communicate with one another and correctly identify important video scenes. This impedes the creativity and productivity of the producers and the storywriters. As a fifth problem, the large volume of original tapes makes it difficult to correlate and communicate all the production information (e.g., "shoot packet documentation") associated with the original tapes. As a sixth problem, the production staff is essentially forced to work out of a central facility because of the need to have physical access to the duplicate tapes and associated documentation.

To date, these problems have hindered the production and development of unscripted programming. A solution to these problems is needed to ease the production of unscripted programming and to enable the genre to expand in new creative directions.

SUMMARY

The present invention provides methods and apparatuses that address these problems.

The present invention encompasses a first exemplary system for assisting one or more users in the production of a media work from a plurality of recordings, with the first exemplary system comprising a file-storage server accessible over a communications network, an intake unit, and a media-library server. The intake unit receives an electrical signal representative of a recording and an identifier for the recording, and stores a digital version of the recording as a file in the file-storage server. The digital-version file is accessible over the communications network by reference to a corresponding network identifier. The intake unit provides a notification of the presence of the digital version to the media-library server. The media-library server maintains a database of digital versions of the recordings and provides records thereof in a form that can be viewed by a user, such as by an internet browser. The media-library server adds a record of the digital version to its database in response to receiving notification from the intake unit.

A preferred embodiment of the first exemplary system may include a notification processor that sends an electronic notification message to one or more users over the communications network upon the completion of the storing of a digital version of a recording. The electronic notification message includes at least the corresponding recording identifier, network identifier of the digital version, or both. Also, a preferred embodiment of the first exemplary system may include a sub-clip processor that divides a digital version into segments, and that stores the segments as respective files in a file-storage server accessible over the communications network by reference to corresponding network identifiers. The sub-clip processor notifies, either directly or indirectly, the media-library server of the existence of the sub-clip files, and the media-library server includes references to the sub-clip files in its record. Also, in a preferred embodiment of the first exemplary system, the media-library server is capable of associating a data file that contains a transcription and/or logging of a recording with the digital version of the recording. This preferred embodiment includes a transcription-logging processor that sends an electronic notification message to at least one transcribing party over the communications network after the digital version of the recording has been stored, the electronic notification message including at least the corresponding identifier of the recording, network identifier of the digital version, or both. Upon receiving the data file from the transcribing party, the transcription-logging processor stores the received data file in a file-storage server accessible over the communications network by reference to a corresponding network identifier, and notifies the media-library server of the existence of the data file. Also, a preferred embodiment of the first exemplary system may comprise an access-control processor that tracks the location of the tangible media of the recordings according to respective identifiers that are affixed to the tangible media. The access-control processor comprises a plurality of asset-control records, with an asset-control record being assigned to each recording tracked by the access-control processor. Each asset-control record comprises a field to hold the identifier of its corresponding recording, a field to hold a representation of the identifier affixed to its corresponding tangible medium, and at least a status field to indicate the location of the tangible medium. The access-control processor sends a notification to the media-library server when the status field of an asset-control record is changed, the notification identifying the corresponding recording and providing an updated status.

The features of the first exemplary system eliminate the need for generation of duplicate tapes (e.g., VHS-work copies), and the corresponding production bottleneck. The features of preferred embodiments of this exemplary system simplify and streamline the management and access of the recordings by providing central access to the content of the recordings by way of the digital versions, by electronically notifying users of the presence of the digital versions, and by monitoring the location of the original recordings. The features of additional preferred embodiments increase access to, and review of, the content of the recordings by providing sub-clips of the records, by managing the procurement of transcription/logging data files, and by enabling easy access to the transcription/logging data files.

The present invention also encompasses a second exemplary system for assisting one or more users in the production of a media work from a plurality of recordings. All or part of the second exemplary system may be incorporated with the first exemplary system, including the preferred embodiments thereof. The second exemplary system comprises a file-storage server accessible over a communications network for storing digital versions of the recordings as files that are accessible over the communications network by reference to corresponding network identifiers. The second exemplary system further comprises a media-library server that maintains a database of library records of the plurality of recordings, each library record for a recording having a field to store the network address of the digital version of the recording and a plurality of information fields that store respective pieces of information about the recording, the media-library server further comprises a set of instructions that generate web-page representations of the library records that are accessible over the communications network.

A preferred embodiment of the second exemplary system has a media-library server that further comprises an instruction set that generates at least one web page accessible over the communications network that presents a dialog box for accepting keywords that may be used to search one or more fields of the library records. Also, in a preferred embodiment of the second exemplary system, at least one library record for a recording comprises a file-association field for associating one or more document files with the recording, and wherein the media-library server generates at least one web page accessible over the communications network that presents a dialog box for accepting a filename or network address of a document file that is to be added to the file-association field.

The features of the second exemplary system simplify for the users the tasks of managing and tracking the content of the recordings. The features of the preferred embodiments of this exemplary system simplify for the users the task of searching the content of the recordings, and facilitate communication among the users.

The present invention also encompasses a third exemplary system for assisting one or more users in the production of a media work from a plurality of recordings. All or part of the third exemplary system may be incorporated with either or both of the first and second exemplary systems, including the preferred embodiments thereof. The third exemplary system comprises a file-storage server accessible over a communications network, an intake unit, and a notification processor. The intake unit receives an electrical signal representative of a recording and an identifier for the recording, and stores a digital version of the recording as a file in the file-storage server. The file is accessible over the communications network by reference to a corresponding network identifier. The notification processor provides an electronic notification message to at least a first entity over the communications network after the completion of the storing of a digital version of a recording. The electronic notification message includes at least the corresponding recording identifier, a network identifier of the digital version, or both.

Accordingly, it is an object of the present invention to enable the facilitation of the production of media works and the like.

It is another object of the present invention to provide production staff with more organized access to recordings and other content assets used to construct media works.

It is another object of the present invention to enable production staff to decrease the amount of time needed to create a media work from recordings and other content assets.

It is yet another object of the present invention to provide production staff with the ability to explore a greater range of creativity in their media works.

These objects and others will become apparent to one of ordinary skill in the art from the present specification, claims, and attached drawings.

BRIEF DESCRIPTION OF THE DRAWINGS

FIG. 2 shows an exemplary intake record used during an exemplary intake process according to the present invention.

FIGS. 3A and 3B show exemplary media access records according to the present invention.

FIG. 4A shows an exemplary library record in web-page format according to the present invention.

FIG. 4B shows an exemplary web page for enabling a user to edit information and to associate files to a library record according to the present invention.

FIGS. 5A and 5B show instances of an exemplary main access web page to the Asset Library according to the present invention.

DETAILED DESCRIPTION

Figure 1:
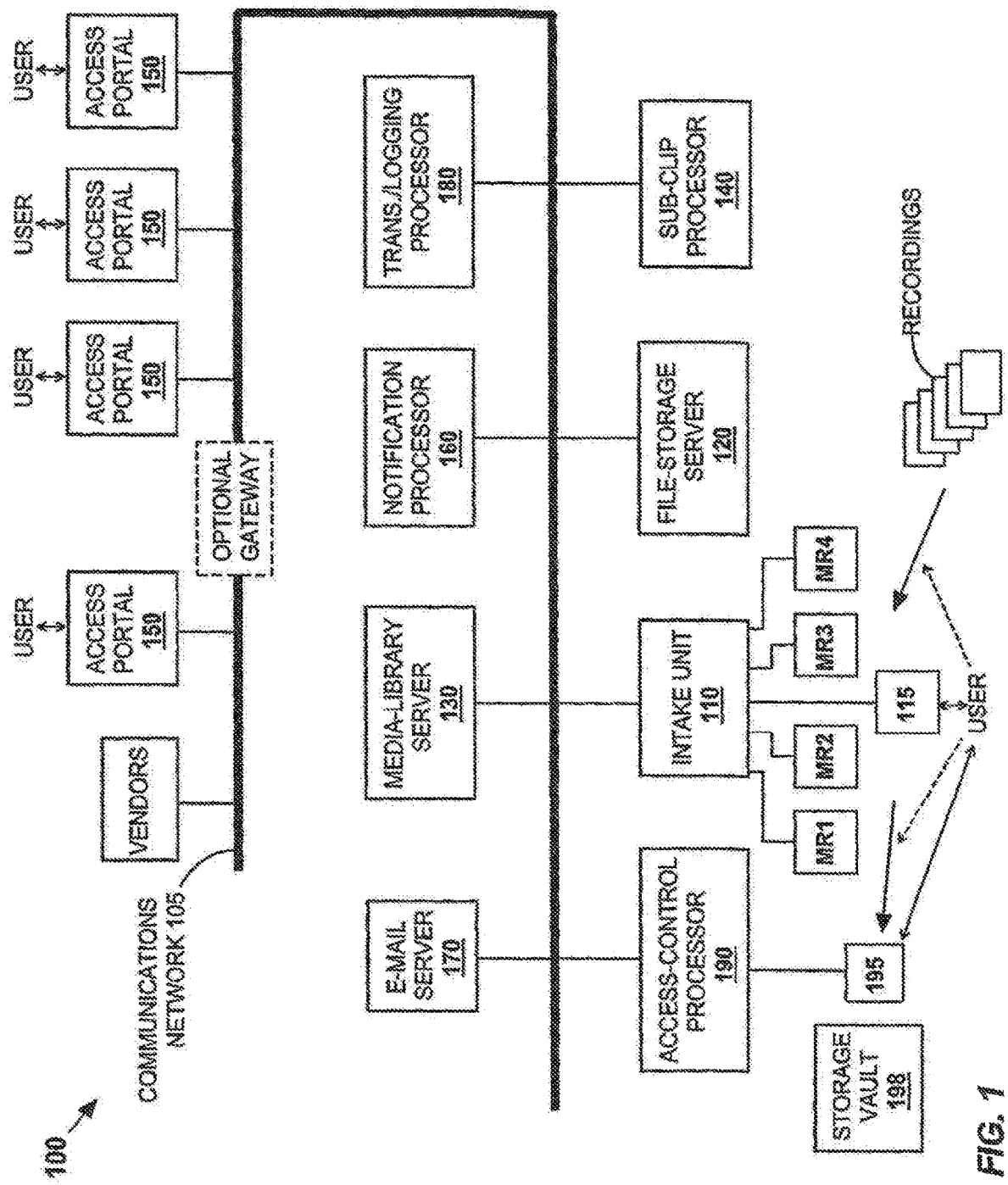
FIG. 1 illustrates a first exemplary system according to the present invention.

The present invention provides several interconnected processes and systems that assist users in the production of media works from content recordings, which may comprise audio recordings, video recordings, photographs, artwork, production notes, and the like. The users of the production methods and systems are collectively referred to as the production staff, and include, but are not limited to, executives, directors, producers, storywriters, editors, assistants, and production staffers. A preferred embodiment 100 of a system according to the present invention is illustrated in FIG. 1. System 100 comprises a plurality of components 110-190 that may be interconnected by a digital-packet-based communications network 105. Communications network 105 may include local networks and the Internet. We briefly describe each of the components first, and then follow up with a more detailed description of their interactions with each other and with the users of the system. As explained below, while components 110-190 are illustrated in FIG. 1 as separate components coupled to communications network 105, various components may be combined together into respective groups.

An intake unit 110 generates digital versions of audio-tapes and videotapes, generally referred to herein as recordings, and places the digital version in a file-storage server 120 that is accessible over communications network 105. A media-library server 130 maintains a database of the stored digital versions of the recordings and enables users to associate various data files, such as logging, transcription, and production-note files, with each digital version. Media-library server 130 includes a digital version in its listing in response to the digital version being generated by intake unit 110. A plurality of access portals 150 provide browser-based navigation to the users of system 100 that enables them to search, listen, and view the digital versions, and to associate additional information and files with each digital version in the library listing.

A notification processor 160 notifies a group of one or more users by e-mail when a digital version of a recording has been generated. The members of the group can be configured and changed by administrators of the system (i.e., users with special access privileges). Multiple groups can be created, and a user operating intake unit 110 can select which groups to notify depending upon the nature of the particular recording that the intake unit is processing. An e-mail server 170 connected to communications network 105 provides e-mail accounts to the users, stores the e-mail messages from notification processor 160, and allows the users to access their e-mail messages through the access portals 150. As another component of system 100, a transcription-logging processor 180 sends an electronic request to a user or outside vendor (both generically referred to herein as a transcribing party) to create a transcription file, log file, or combination transcription/log file for a recording when the corresponding digital version has been generated. Transcription-logging processor 180 receives in return a data file of the transcription and/or log, loads it into file-storage server 120 or the like, and causes the media-library server 130 to include the data file in its listing along with the digital version.

As an enhancement of system 100, a sub-clip processor 140 can selectively divide a digital version of a recording into sub-clips based one or more of the following criteria: scene changes, breaks in time codes, periodic intervals (usually to the nearest key frame or audio dead space). The sub-clips may be stored in file-storage server 120 or similar device that is accessible over communications network 105. As another enhancement, an access-control processor 190 allocates and maintains a data field for a bar-code identifier (or other suitable types of identifier) and an access-history table for each recording. The bar-code field is capable of storing the identification information contained by a bar-code identifier affixed to the recording's tangible medium, and the access-history table is capable of indicating when the recording's tangible medium is removed from a designated location 198 (e.g., storage vault) and by whom.

While components 110-190 are illustrated as separate components coupled to communications network 105, it may be appreciated that some or all of the components may be combined together into one or more respective groups. For example, file-storage server 120 may be combined with one or more of intake unit 110, media-library server 130 and e-mail server 170; media-library server 130 may be combined with one or more of intake unit 110, file-storage server 120, and e-mail server 170; sub-clip processor 140 may be combined with one or more of intake unit 110, file-storage server 120, media-library server 130, and processors 160, 170, 180, and 190; and each of components 160, 170, 180, and 190 may be combined with any of components 110-140 and 160-190.

Having given an overview of preferred embodiments of the present invention, we now turn to providing a detailed description thereof.

Intake unit 110 comprises a user interface 115, a plurality of input ports coupled to a corresponding plurality of media readers MR1-MR4 to receive electrical signals representative of the recording being read (e.g., played) by media readers MR1-MR4, a processor, and several sets of instructions that direct the processor in specific tasks, as described below in greater detail. Intake unit 110 is capable of receiving an electrical signal representative of a recording on each of its input ports coupled to the media readers, and of receiving a recording identifier for the recording from a user operating intake unit 110. The electrical signal may be in analog form or digital form. The intake unit stores a digital version of the recording as a file in file-storage server 120, typically via communications network 105. If the electrical signal is in analog form, the processor is directed through a set of instructions to generate a digital version from the analog signal. If the electrical signal is in digital form, the processor is directed through another set of instructions to generate the digital version as a copy of the digital electrical signal directly or with some modifications, or to generate the digital version in a different digital format from that of the digital electrical signal by way of a trans-coding process, as determined by user input. In all cases, the processor is preferably directed to include time-stamp codes into the digital version, the time codes preferably comprising the standard SMPTE format (Society of Motion Picture and Television Engineers), or a form that can be later used to generate the SMPTE format.

The digital version stored on file-storage server 120 can be accessed by components of system 110 over communications network 105 by reference to a corresponding network identifier. The network identifier may take any conventional form, including common forms used for the Internet, wide-area networks, local-area networks, and the like. One exemplary form of a network identifier suitable for Internet access may be:

> https://FileStorageID.ProductionCompany.com/Digital-VersionsDirector-y/RecordingID.xyz where "https://FileStorage.ProductionCompany.com" indicates the Internet protocol and IP address to file-storage server 120, where "DigitalVersionsDirectory" indicates the file directory of server 120 where the digital version is stored, where "RecordingID" uniquely identifies the recording to which the digital version corresponds, and where "xyz" identifies the media type of the digital version, such as mpg, avi, mpw, way, etc. "RecordingID" is the previously-described recording identifier for the recording (as provided to intake unit 110 by a user) or is derived from it. If the components of system 100 are interconnected by a wide-area network or a local area network, then one exemplary form of a network identifier may be:

> \\FileStorageID\DigitalVersionsDirectory\RecordingID.xyz where "\\FileStorageID\" indicates the network address to file-storage server 120, and where "DigitalVersionsDirectory", "RecordingID", and "xyz" have their previous meanings.

In preferred embodiments of system 100, intake unit 110 presents to the user, by way of user interface 115, an intake record to be filled out before a digital version of the recording is generated. An exemplary record is shown in FIG. 2. It comprises a field ("Recording Identifier") to receive an identifier for the recording, a field ("Bar-Code Data") to receive bar-code data of a bar-code identifier that is affixed to the recording's tangible medium, a field ("Media Type") to indicate the media type (e.g., Beta SP tape, S-VHS tape, digital DV tape, optical disc, audio record, audio compact disc, etc.), and a field ("File Storage Location") to indicate where on the network (e.g., the directory on file-storage server 120) the digital version will be stored, which will be used to set the "FileStorageID" and "DigitalVersionsDirectory" portions of the network address of the digital version. The "Recording Identifier" field will be used to set or derive the "RecordingID" portion of the network address. To simplify the presentation of the present invention, and without loss of generality, we will take the case where the "RecordingID" portion of the network address for the digital version is identical to the value provided by the user in the "Recording Identifier" field of the intake record.

The intake record further comprises a field ("Input Port") to indicate on which input port the recording will be received (e.g., which media reader MR1-MR4 will be used to play the recording), and a field ("Video Format") to indicate the digital format of the digital version (optionally including a resolution field). The contents of the "Video Format" field will determine the file extension "xyz" of the network address of the digital version. One or more of the input ports may be preset (i.e., hardwired) to receive a particular format of electrical signal, such as analog audio, digital audio, analog YUV format (NTSC or PAL) with separated analog audio, analog composite video (NTSC or PAL) with combined audio, digital video (e.g., DV), etc. In such case, intake unit 110 is programmed with the knowledge of the particular format for the input port. As another approach, which may be used alone or in combination with the prior approach, one or more of the input ports may have two or more connectors to receive different types of formats. In this case, the intake record may include an additional selection field (not shown in the figure) for the port where the user can select which connector is to be used for the input port. Alternatively, intake unit 110 may include electronic detection circuitry at each connector to detect the presence of an electrical signal, and thereby determine which connector and format are being used.

The preferred embodiments of the intake record shown in FIG. 2 further comprise a field ("Sub-Clips") indicating whether sub-clips are to be generated (optionally including a "Criteria" field for defining the clips), a field ("Notify upon completion of intake") to indicate the users (and/or groups of users) who will receive notification upon completion of the digital version, and one or more fields ("Request Transcript/Log") to indicate whether the digital version is to be transcribed and/or logged, and by whom. For the latter two fields, intake unit 110 preferably presents the user with respective lists of groups of users, individuals (e.g., other users), and vendors to select from. To obtain the values for these fields, intake unit 110 can send request messages over communications network 105 to notification processor 160 and transcription-logging processor 180 requesting the names of the groups, individuals, and vendors to be presented for selection. Processors 160 and 180 can then send reply messages to intake unit 110 with the requested information. Processors 160 and 180 are configured beforehand with this information by a system administrator. There are several types of network communications protocols known to the art for sending and receiving the above types of messages between components over communications network, and any one of them may be used to implement the messaging between component 110 and components 160 and 180. The details of communications between components are described below in greater detail.

To expedite the process of filling out an intake record, intake unit 110 may comprise a plurality of selectable templates for the intake records, with each template filling in selected fields with preset values. For example, a default template may be used which pre-fills the following fields: File Storage Location, the video and audio format fields, the sub-clip fields, the notification fields, and the transcription/logging fields. The user is then required to enter the recording's identifier, the bar code on the recording's medium (preferably entered by means of a conventional, hand-held, bar-code scanner), the input port (i.e., MR1, MR2, MR3, or MR4), and preferably his/her name at the bottom of the intake record. The user is preferably allowed to change the pre-filled fields to meet particular circumstances. However, preferred embodiments also enable a system administrator to lock one or more of the pre-filled fields to set values that cannot be changed by the user performing the intake process.

In preferred practices of processing the recordings, a user obtains the tangible form of a recording, affixes a bar-code identifier to it, fills out a corresponding intake record for the recording by way of user interface 115 (preferably scanning the bar code with a scanner), and places the tangible form in one of media readers MR1-MR4 to be read. Thereafter, the user issues a start command to intake unit 110 to start its processing, and issues a start command to the selected media reader. The former command may be issued by keystroke or mouse click by the user on the intake record, and the latter command may be issued by the user pressing a play button on the media reader. As another approach to issuing the latter command, the intake unit 110 may send an electronic signal to the selected media reader via interconnect cable to start playing when the user issues the start command to intake unit 110. Intake unit 110 may start storing the digital version at file-storage server 120 in segments as the intake process occurs, or may wait until the completion of the intake process before storing the digital version at server 120. In the latter case, the entire file may be temporarily stored by a storage device within intake unit 110.

When the generation of the digital version of the recording has been completed, intake unit 110 either directly or indirectly notifies each of components 130, 140, 160, 180, and 190 of the completion. The notification may be done by a number of approaches. As a first exemplary notification approach, intake unit 110 may inform each of the components individually, by electronic messages, according to the information contained on the intake record for the recording. If a component has not been combined with intake unit 110, the e-mail notification message may be conveyed through communications network 105. If the component is combined with intake unit 110, the e-mail notification can be done by internal message (e.g., software-based communication between instruction sets). Each of components 130, 140, 160, and 180 receives at least the recording identifier and/or the storage location of the digital version of the recording, and also receives additional information fields pertinent to its particular task. In particular, sub-clip processor 140 additionally receives the sub-clip information fields, notification processor 160 additionally receives the field comprising the list of individuals and groups to notify, and transcription-logging processor 180 additionally receives the transcription/logging information fields. Access-control processor 190 receives at least the recording-identifier field, the bar-code field, optionally the media-type field, and preferably the name field of the user who started the intake process. Each of the components, of course, may receive more information fields than indicated above. The conveying of this information indicates the presence of a new recording and corresponding digital version to components 130, 140, 160, 180, and 190, which can then undertake their corresponding tasks.

In preferred embodiments, each of components 130, 140, 160, and 180 receives both the recording identifier and the network identifier of the digital version as part of the notification from intake unit 110. However, system 100 may be implemented in a manner where all digital versions are placed in a preset directory on server 120, and where the file name (i.e., network identifier) of each digital version comprises the recording identifier. In this implementation, the recording identifier can be deduced from the network identifier, and the network identifier can be deduced from the recording identifier. Thus, in this implementation, each of components 130, 140, 160, and 180 need only receive the recording identifier or the network identifier of the digital version as part of the notification from intake unit 110.

As a second exemplary notification approach, intake unit 110 can send the contents of the intake record to one of the other components (or a dedicated component not shown in FIG. 1), and that component can handle the notification of the other components in the manner described immediately above. As a third exemplary notification approach, intake unit 110 can place a copy of the intake record at a designated storage location (such as under a specific file directory under file-storage server 120), and each of the components that needs the notification can comprise a sub-process that periodically checks the designated storage location for newly-added intake records. When a newly-added intake record is detected, the system component can read it and determine what actions to take based on the data in the record's fields. Combinations of the above approaches may also be used; for example, some components may receive direct notification while other components would periodically check the designated storage location for newly-added intake records.

Also upon completion of the intake process, a user removes the tangible medium of the recording from the media reader, and places it into the storage vault 198, or gives it to another user to do so. The storage vault is preferably used to store all of the media assets, including the tangible media of the recordings, associated with the production project. Beforehand, the user notifies access-control processor 190 by way of a user interface 195 that the tangible medium is being placed in storage vault 198. Access-control processor 190 maintains a database of asset-control records, with an asset-control record being assigned to at least each asset that is to be kept in vault 198. User interface 195 comprises a keyboard and screen, and preferably a hand-held bar-code scanner. The user scans the bar code of the tangible medium with the bar-code scanner, which provides the bar-code number to processor 195. Processor 195 searches its database for the asset-control record that corresponds to the scanned bar-code number. Beforehand, access-control processor 190 preferably received a notification from intake unit 110, either directly or indirectly, containing the pertinent information from the intake record for the recording's tangible medium. Access-control processor 190 creates a media-access record for the recording's tangible medium from this pertinent information, and places the media-access record in its database of asset-control records. If processor 195 has not yet received the notification, it can send an inquiry message to intake unit 110 asking for the recording's information, or it can check the designated storage location for newly-added intake records, depending upon how the notification procedure has been configured (as described above).

An exemplary media-access record is illustrated in FIG. 3A. It comprises a field to hold the recording identifier (such as entered by the user during the intake process), a field to hold the number of the bar-code that has been affixed to the tangible medium of the recording, an optional field to indicate the type of medium (e.g., VHS tape, Beta SP tape, recordable optical disc, art work, etc.), and another optional field to indicate the location within storage vault 198. The first three fields of the asset-control record are received from intake unit 110, unless the media asset did not undergo the intake process (such as would be the case with art work). In this case, processor 190 enables the user to create an asset-control record and fill in the first three fields. The exemplary asset-control record also comprises an access table that holds a history of when the medium has been checked out from the vault and checked in to the vault, and by whom. Each time the tangible medium of the recording is checked in or checked out of the vault, the user in charge of the vault scans the bar-code on the tangible medium with the bar-code scanner. In response, the access-control processor 190 accesses its database for the asset-control record of the corresponding recording, and displays a processing dialog to the user on a screen of interface 195. The processing dialog box is shown in FIG. 3B in the case where the tangible medium is being checked out. Each time an asset-control record is created or updated, access-control processor 190 can be configured to send an electronic message to media-library server 130 in order to update these components on the status of the recording's tangible medium. The electronic message provides the recording identifier, the current status of the tangible medium, and a network link to the asset-control record. This enables media-library server 130 to provide the current status of the recording's tangible medium (checked in or checked out and by whom), and a network link to the medium's asset-control record to a user by way of a web page of information about the recording, as described below in greater detail.

During the intake process, intake unit 110 performs any digitization, encoding, and trans-coding indicated by the intake record. For this, intake unit 110 comprises an audio digitizing unit, a video digitizing unit, one or more encoders, and/or one or more trans-coders. The digitizing units are common to the art, and readily integrated into systems. Encoders and trans-coders are typically implemented by a data processor operating under the direction of respective sets of instructions (e.g., "codecs"). Such instruction sets are commercially available, and can be integrated into the processor of intake unit 110 without undue experimentation. As indicated above, intake unit 110 knows the format of the electronic signal being provided to each of its input ports for media readers MR1-MR4. With this knowledge, intake unit 110 can readily select an appropriate set of digitization parameters to configure the digitizing unit (if the input signal is analog), and an appropriate encoder or trans-coder to generate the digital version in the format that the user has selected on the intake record.

Figure 8:
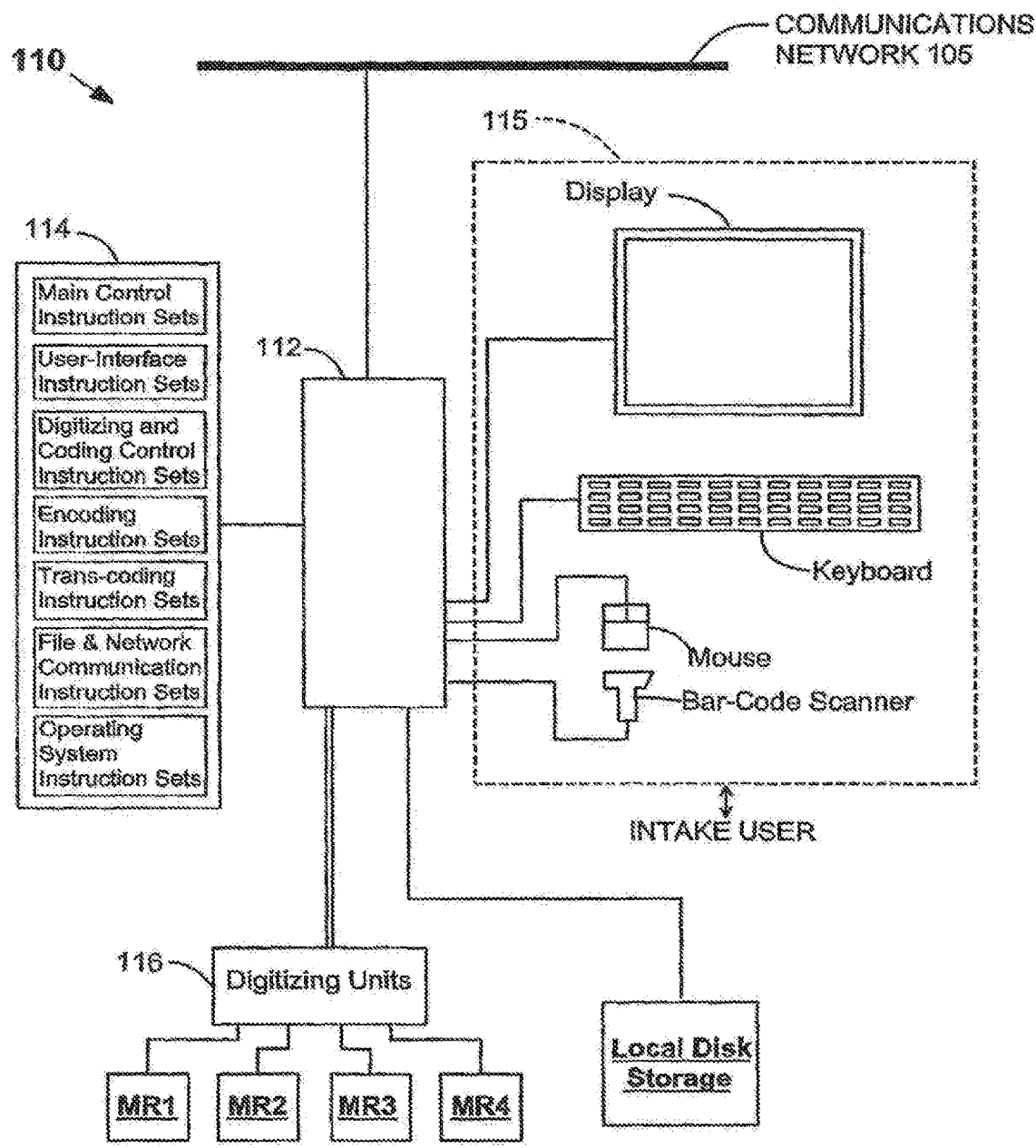
FIG. 8 shows an exemplary embodiment of an intake unit according to the present invention.

FIG. 8 shows an exemplary embodiment of intake unit 110. In addition to the connection to communications network 105 and user interface 115 (previously shown in FIG. 1), intake unit 110 further comprises a data processor 112 operating under the direction of a plurality of instruction sets stored on a computer-readable medium 114, and a group 116 of one or more digitizing units (analog and/or video) coupled between the media readers MR1-MR4 and data processor 112. Data processor 112 comprises one or more bus interfaces to the digitizing units 116, and I/O ports to user interface 115, such as to a display, keyboard, and mouse. Computer-readable medium 114 may comprise the forms of electronic memory, magnetic memory (e.g., hard-drive discs), optical memory (e.g., CD-ROMs), or combinations thereof. The user interface instructions direct the processor to present an intake record to the user, to enable the user to input information into the fields of the intake record, and to hand off a completed intake record to the main control instruction sets for handling. The main control instruction sets direct data processor 112 to determine how the digitizing units should be configured, and which encoding and trans-coding instruction to use based on the information provided in the intake record. The main control instruction sets further direct data processor 112 to configure and activate the appropriate digitizing units in group 116 under the direction of a set of digitizing and coding control instruction sets, and to direct data processor 112 to undertake the appropriate encoding and/or trans-coding processes under the direction of the appropriate encoding and trans-coding instruction sets to generate the digital version of the recording. The encoding and trans-coding instruction sets preferably include subsets of instructions that direct processor 112 to insert SMPTE time codes into the digital version, preferably while it is being generated. These instruction sets can also direct data processor 112 to detect the end of the recording, at which point the main control instruction sets are notified. Thereafter, the main control instruction sets direct data processor 112 to determine from the intake record the location where the digital version is to be stored, to store the digital version at that location, to further determine which components of system 100 are to receive notification of the completion of the digital version, and to send notifications to those components and to Media Library 130. Alternatively, and as discussed above, the main control instruction sets may direct data processor 112 to provide a notification of completion (along with appropriate information) at a predefined storage location, which is periodically monitored by the other components. In either case, these communications are performed by data processor 112 under the direction of a conventional set of network communication instruction sets configured to undertake the notification tasks according to the present invention. Based on the description of the invention provided herein, it is within the ability of one of ordinary skill in the art to compose the above-described instruction sets of intake unit 110.

The above groups of instruction sets may be run on a conventional operating system, such as Microsoft Windows or Apple's MAC OS. The operating system enables instruction sets to be run by separate parallel processes on data processor 110, with the operating system allocating recurring slices of processing time to each of the processes in a multiplexed manner, and providing communication facilities for the processes to communicate with one another. As such, the tasks performed by each group of instruction sets outlined above may be respective parallel processes, with communications between the tasks of these groups being routed through the inter-process communication facilities of the operating system. Conventional operating systems also enable programmers to run several instruction-set groups under one process, but with each instruction-set group being handled by a respective thread of process execution. This enables the programmer to handle the communications between the instruction-set groups within the program's own environment, without relying upon the inter-process communications facilities of the operating system. In this case, the above group of instruction sets may be run by respective parallel threads of execution within a single process, with communications between the tasks of these groups being managed by data objects and methods that are global to all of the threads. The tasks directed by the instruction set groups illustrated in FIG. 8 may be allocated to respective processes and/or threads, with data communications between them. As an example, the respective tasks of the main control instruction sets, user-interface instruction sets, and digitizing and coding control instruction sets may be run by respective execution threads of a single process. The tasks directed by the encoding and trans-coding instruction sets may be run as respective execution threads of another process. In this regard, data processor 112 may include dedicated processing units to carry out the tasks specified by the encoding and trans-coding instruction sets.

As indicated above, intake unit 110 sends and receives messages from several of the other system components, and selected ones of the other system components convey messages amongst themselves, as indicated above and further below. In this paragraph, we describe how this messaging can be readily accomplished, as well has how the various components can monitor file directories for newly added files and the like. In typical implementations, each of components 110-140 and 160-190 generally comprises a data processor running under the direction of an application program (a collection of one or more instruction sets), which in turn is running on top of an operating system, such as Windows, Mac OS, UNIX, etc. These elements are shown in FIG. 8 for intake unit 110, in FIG. 9 for components 120, 140, and 160-190, and in FIG. 10 for media-library server 130. The instruction sets of the application program are stored on a computer-readable medium, and typically comprise main control instruction sets, one or more task-specific instruction sets that are specific to the tasks performed by the component, and file and network communication instruction sets. The main control instruction sets direct the data processor to provide the main control for the component, and the user-interface instructions that direct the data processor to enable a system administrator (and a user in the case of component 190) to manage, configure, and use the component by way of the user interface (or by way of a web-based interface accessible through a portal 150). The file and network communication instruction sets direct the data processor to obtain and provide information/data to the file system and other components of the system over the network through various file system protocols and network communication protocols. The instruction sets of each application program can be written in such languages as C++, Java, Visual Basic, etc. Some of the application programs, such as that for e-mail server 170, are commercially written and need only be configured to the specific task. The file system protocols are built into the operating systems as basic services, and the network communications protocols are generally built into the operating systems as basic services (e.g., SMTP, CDO, POP services), or can be installed as a software layer operating between the application programs and the operating system. In any event, each file-system and network-communication protocol service provides its own application program interface (API), which comprises a set of command instructions that can be invoked by the instruction sets of the application program (e.g., through function calls and subroutine calls in the programming languages of C++, Java, Visual Basic, etc.). These API command instructions enable the sending of text and/or data objects in one application program to a selected network address or file storage location, where it can be picked up and read by another application program. In this case, the other application program periodically issues an API-command instruction to retrieve data at the selected network address or file storage location. As to monitoring directories for the presence of newly-added files, modern operating systems include file systems that provide their own API with command instructions that can request the contents of a selected directory, including information on each file in the directory (such as file size and creation date). Many file systems are network enabled, and allow an application program to request the contents of a selected directory on a network server that is separate from the component that is running the application program.

Portal 150 may comprise a conventional personal computer running a network communication program that communicates with network 105, and a network browser program and related programs that communicate with the network communication program. An exemplary communication program is the common TCP/IP internet protocol software (now generally integrated into most computer operating systems); exemplary browser programs include Netscape Navigator and Microsoft Internet Explorer, and exemplary related programs include commercially available media viewers such as QuickTime Viewer and Microsoft Media Player. Portal 150 also provides each user with access to an e-mail account hosted by e-mail server 170 to receive e-mail notifications from various components of system 100, such as notification processor 160 and transcription-logging processor 180. The e-mail access program may be provided by Microsoft's Outlook, or Apple's Mail program (the latter of which is generally provided as part of the Mac operating system).

Figure 10:
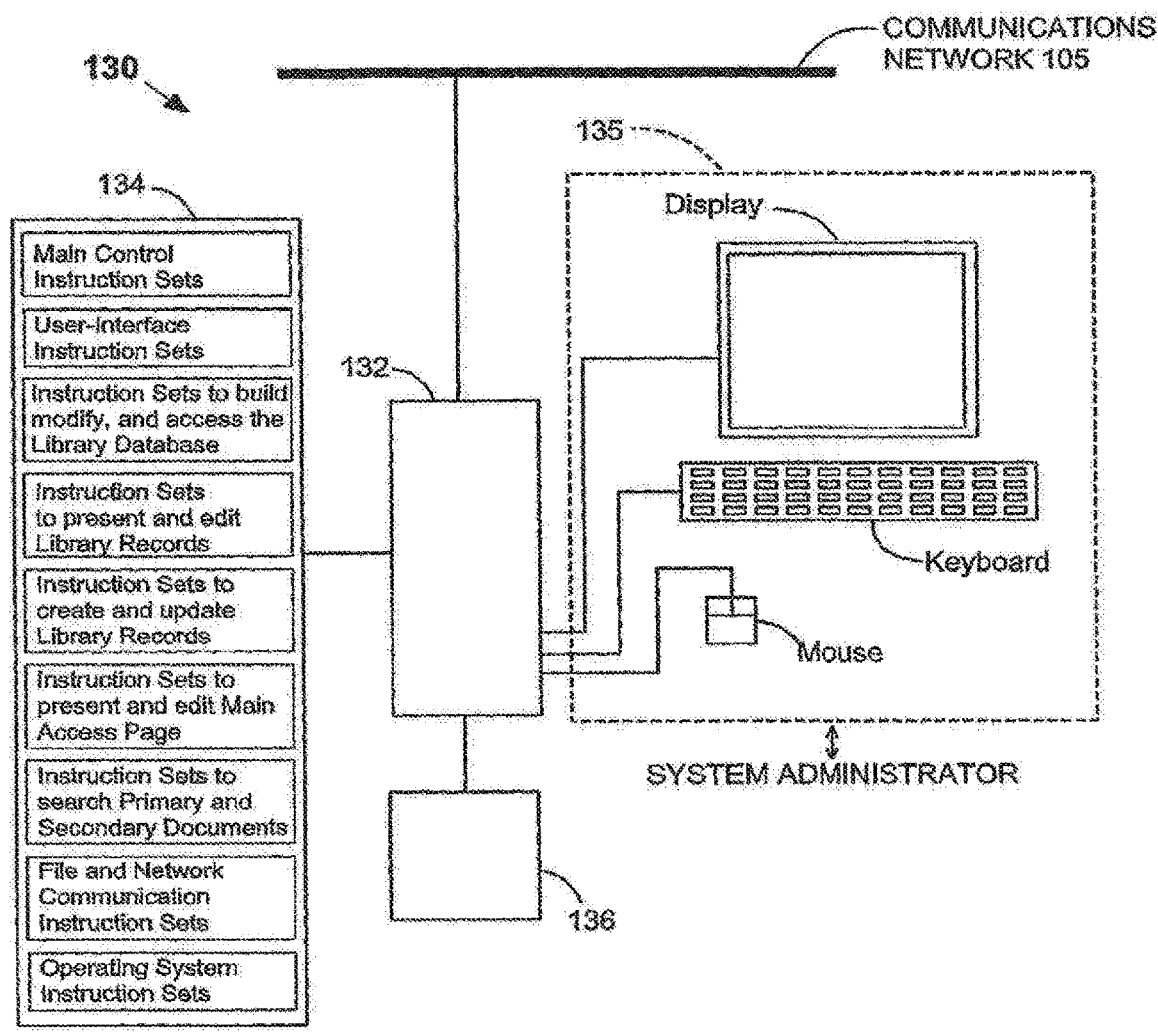
FIG. 10 shows an exemplary embodiment of a media-library server according to the present invention.

Referring to FIG. 10, media-library server 130 comprises a data processor 132 operating under the direction of a plurality of instruction sets stored on a computer-readable medium 134, a user interface 135 coupled to data processor 132 for use by a system administrator, and a non-volatile data storage device 136 (e.g., storage disk) coupled to data processor 132. Computer-readable medium 134 may comprise the forms of electronic memory, magnetic memory (e.g., hard-drive discs), optical memory (e.g., CD-ROMs), or combinations thereof. Instead of having user interface 135, media-library server 130 may have a web-based interface accessible by at least one of portals 150 via web browser. Media-library server 130 has main control instruction sets that direct the data processor in providing the overall control of server 130, and user-interface instruction sets to direct data processor 132 to enable a system administrator to manage and configure the server through interface 135 and/or the web-based interface. Media-library server 130 maintains a library record for each recording and other media asset being produced or used by the production staff. The library record can be presented to a user as a web page (e.g., html document or the like) that can be viewed on a portal 150 by the browser software. An exemplary library record is shown in FIG. 4A in web-page format, and typically includes: the recording identifier, the network location and/or network link to the digital version, the bar code of the tangible medium, the network location and/or network link to transcription and logging files of the recording, additional information collected during the intake process, and additional information added by users after the library record has been created. Such additional information typically comprises information on the crew that produced the recording, the date of production, and links to files that contain production notes and camera and lighting metadata. To access the library record of a media asset (e.g., a recording), media-library server 130 presents a main access page to the user by way of a portal 150. An exemplary main access page is illustrated in FIG. 5A, and described below in greater detail.

Media-library server 130 maintains a database of the library records (the "Library Database") that it can search and present to users as requested. The Library Database may be physically stored at file-storage server 120 in a directory designated for the purpose, or may be stored on a separate file storage device that is either incorporated with media-library server 130 or separate from it. The Library Database comprises at least one index file that contains a plurality of information fields (columns) for storing information about a plurality of library records (rows), and that can be searched across one or more of the information fields by media-library server 130 to find library records that match a selected search criterion. The Library Database may be constructed in a number of ways. As one way, the information presented on a library record (FIG. 4A), including network links to other files, is placed in one row of the index file under appropriate information fields (e.g., columns), and all the information fields can be searched. For this, server 130 has instruction sets (as shown in FIG. 10) that direct processor 132 to build, modify, and access the Library Database. A set of computer instructions running on server 130, indicated in FIG. 10 as "Instruction Sets to present and edit Library Records," can be provided to access a library record from the database index file, and to present it to a user. This set of instructions receives a request from a user (via a portal 150) to view a particular library record, finds the record in the index file based on information provided to it by the user, reads out the information fields corresponding to the requested library record, generates an html-based web page for the library record (e.g., FIG. 4A) with the information fields formatted according to a preset template, and transmits the web page electronically to the user's portal 150. The request by the user is typically sent by way of an html request message, which can be initiated by the clicking of an html link, a search box, or a view link on the main web page (FIG. 5A). These instruction sets may comprise a common-gateway interface (CGI) scripts.

As a second way of constructing the Library Database, media-library server 130 can store a pre-generated web page for each library record, each web page having a unique filename, and can construct the index file as indicated above, with the exception that some of the information fields can be removed (those that are not commonly searched), and with the exception that a new information field is added to contain the unique filenames of the pre-generated web pages. Data processor 132 is directed in these tasks by the "Instruction Sets to build, modify, and access the Library Database." When a user requests a library record, server 130 can search the index file to find the index record and unique filename for the library record based on the criteria provided by the user, locate the corresponding pre-generated web page using the unique filename, and transmit it electronically to the user's portal 150. Data processor 132 is directed in these tasks by the "Instruction Sets to present and edit Library Records," and may comprise a common-gateway interface (CGI) script. In some instances, the user can provide server 130 with the unique filename directly, as could be the case when the user clicks on an html link to the desired web page, in which case a search of the index file would not be necessary. Based on the description of the invention provided herein, it is within the ability of one of ordinary skill in the art to compose the above-described instruction sets.

In each of the above ways of constructing the Library Database, the "Instruction Sets to build, modify, and access the Library Database" and the index file may be implemented using a commercially-available Structured-Query Language (SQL) database, such as Microsoft Access, or by other commercially available databases. Each of these databases provides an API with corresponding command instructions for creating, accessing, and modifying columns and rows of the index file (i.e., creating, accessing, and modifying individual database records), and for obtaining data sets of database records matching particular search criteria. The instruction sets for directing server 130 in the tasks of receiving requests from users, obtaining the database information, and providing it to the users in each of the above ways can be implemented with commercially-available Common Gateway Interface (CGI) program scripts that can be configured for specific tasks, or can be implemented by specifically written CGI scripts with the aid of commercially-available CGI script development tools. In general, the CGI scripts can directly access the API of the database programs, or simple intermediate interfaces can be written in C++ and other languages to connect the CGI scripts with the API of a database program. For the second way of constructing the Library Database, the web pages may be pre-generated by commercially-available scripts for generating web pages (e.g., template-based scripting programs). While the above ways use a single index file, it may be appreciated that two or more separate index files with different groupings of information fields may be used to optimize the search speed for different types of searches.

When media-library server 130 receives notification that a new recording has been processed by intake unit 110, it creates a library record for the recording. This includes updating the index file to include a row for the new library record, and includes generating a pre-generated web page for the library record (if the second way of constructing the Library Database is used). For this, server 130 comprises a group of "Instruction Sets to create and update Library Records" (FIG. 10) that direct data processor 132 to do these tasks. These instruction sets also direct data processor 132 to receive information from sub-clip processor 140, transcription/logging processor 180, and access-control processor 190 about recordings and their respective digital versions, and to update the Library Database with the received information. These instruction sets can be written as CGI scripts or can be in programming languages such as C++, Java, Visual Basic, etc. In either case, command instructions to the API of the database software can be used to update the index file, and the APIs of the communications-protocol services of the operating systems can be used to communicate messages between server 130 and intake unit 110. Based on the description of the invention provided herein, it is within the ability of one of ordinary skill in the art to compose these instruction sets.

In exemplary embodiments, in order to enable users to add or change information on an asset-library record of a media asset, a network link is provided on the web page of the media asset (or the main access web page) to pull up another web page that enables a user to make additions and changes. The link is shown in FIG. 4A as the "Click to Edit This Page" button, and it pulls up the "Edit Asset Library Record" web page shown in FIG. 4B. This web page is generated by media-library server 130 (as directed by the "Instruction Sets to present and edit Library Records") and it reproduces the current information of the record. The fields of the record that are allowed to be changed by the user are placed in editable dialog boxes. These fields typically include the Segment Title, Tape Name, Producer, Field Producer, the Camera/Crew personnel, the Shoot location, and the Shoot Date fields. Media-library server 130 can be configured by a system administrator to only allow certain fields to be edited by selected users. For example, production coordinators may be the only users allowed to edit the Segment Title and Tape Name fields, while the producers, field producers, and assistant producers would be the only users allowed to edit the Producer, Field Producer, Camera/Crew, Shoot Location, and Shoot Date fields. Storywriters, creative directors, and production staffers would not be allowed to edit these fields. The web page of FIG. 4B also has dialog boxes that enable users to change or remove production note files and secondary files, and to add new files. An existing file can be deleted by removing it from the dialog box, or it can be changed to another file by clicking on the "Browse Files" button, which brings up a search box that enables the user to search file directories accessible over communications network 105, and to enter the name of a different file into the editable dialog box. At least one empty dialog box is provided to add another production note to the page, and at least one empty dialog box is provided to add another secondary file to the page. To add a file, a user types a new filename into the empty box, or clicks on the "Upload File" button. In the first case, a blank document with the given name and file extension will be created in a preset directory for the production notes or the secondary files for the media asset. In the second case, the "Upload File" button will bring up a search box that enables the user to search the network resources and local computer drives for a desired file, which is then copied (i.e., "uploaded") to the preset directory for the production notes or the secondary files for the media asset.

Once the user has edited the dialog boxes of interest, the user clicks on the "Click to Save Changes" button. This sends an html request back to media-library server 130. The request contains an identifier for each editable field and a corresponding value for each editable field. Server 130 examines the values of these fields for differences with respect to the current form of the corresponding media library record to determine the changes requested by the user, makes the changes on the corresponding media library record to update it, and sends the user a revised web page (FIG. 4A) for confirmation. The modified web page (FIG. 4A) will list the newly added documents, along with hyperlinks (i.e., network links) that all users can click on to access the documents. Conventional html record formatting may be used to implement the editable dialog boxes, and conventional CGI scripts may be used to implement the instruction sets that direct media 130 in providing the "Edit Asset Library Record" web page to the user and in making the changes requested by the user. The edit web page shown in FIG. 4B also has a "Cancel" button which enables the user to end the editing process without making changes to the library record. This may be implemented as a network link back to the "Asset Library Record" web page shown in FIG. 4A. Referring to FIG. 10, data processor 132 is directed to perform the above tasks by the "Instruction Sets to present and edit Library Records."

Media-library server 130 preferably enables the users to search the contents of the transcription files, the log files, the production note files, and the secondary documents that are associated with a media asset. The contents may be searched by time code reference as well as text words (both being generically referred to herein as "keywords"). This can be accomplished in a number of ways. As one example, media server 130 creates an index file of these documents, the index file having at least the network identifier of the document and the asset record that it is associated with. When a user requests a search of these documents, which may be done by way of the second search box shown in each of FIGS. 5A and 5B, media-library server 130 runs a search of the files listed in the index to find matches to the keywords. The searching may be done by invoking a file system search program, such as that integrated into the Microsoft Windows operating system, or a commercially available network-based search engine, similar to those provided by Yahoo and Google. (Each of these search engines can typically be configured to build a searching index of the files for faster searching.) The results may then be presented to the user by a webpage, with an indication of the network link to each matching file and an indication of the media asset that it is associated with and a link to the library record of that media asset. These tasks can be readily implemented with instruction sets that direct the operation of the data processor 132 of media-library server 130 to perform the above tasks ("Instruction Sets to search Primary and Secondary Documents" in FIG. 10). The instruction sets can be based on CGI scripts, or other as well as other scripts, and can use command instructions to the API of the file system. Based on the description of the invention provided herein, it is within the ordinary skill of a person in the art to compose these scripts.

Referring back to FIG. 4A, when access-control processor 190 sends an electronic message to media-library server 130 to update the storage status of a recording's tangible medium, server 130 updates the library record to reflect the information provided in the electronic message. The electronic message may be sent and received by using instruction sets similar to those described above for other electronic messaging. The electronic message typically contains the recording identifier, an indication of the status of the tangible medium (e.g., checked in, checked out), and a network link to a web page that provides the contents of the asset-control record (e.g., such as that depicted in FIG. 3A) for the tangible medium, which includes the access history. The provision of the recording identifier in the electronic message enables the corresponding library record to be found and updated with the new status information. Media-library server 130 can also insert into the library record the network link to a web page that brings up the asset-control record for the tangible medium. This enables media-library server 130 to provide the current status of the recording's tangible medium (checked in or checked out), and a network link to a web page that displays the medium's asset-control record, which has the access history of the tangible medium. Referring to FIG. 10, the "Instruction Sets to create and update Library Records" comprises instructions to direct data processor 132 to perform these tasks. The instruction sets can be based on CGI scripts, or other scripts, and can use command instructions to the API of the file systems of the components to accomplish the electronic messaging. Based on the description of the invention provided herein, it is within the ordinary skill of a person in the art to compose these scripts.

Upon completion of the intake process, notification processor 160 receives electronic notification from intake unit 110 of at least the recording identifier and/or the file-storage location of the recording's digital version, and a list of groups and/or individuals to notify. Notification processor 160 then generates an e-mail message for each group and/or individual to notify, and sends the e-mail messages to e-mail server 170. The e-mail message contains at least the recording identifier and/or the file-storage location of the recording's digital version, and a text message indicating that the intake process for the recording has been completed. E-mail server 170 stores these messages so that the users of the system can access them through portals 150. E-mail server 170 may comprise, for example, a data processor running Microsoft's Exchange software or Apple's Mac OS X server software (see FIG. 9 for a general configuration of processor 170). The tasks done by Notification processor 160 can be readily implemented with instruction sets that direct the operations of the data processor of notification processor 160 (also see FIG. 9 for a general configuration of processor 160). Notification processor 160 can be implemented in a number of ways. As one straightforward way, a set of instructions directs processor 160 to receive or otherwise obtain the above-identified information from intake unit 110, and then to generate e-mail messages and send them to the accounts of the designated individuals on e-mail server 170. The instruction set can be written in scripts or programming languages such as C++, Java, Visual Basic, etc. In order to receive the electronic notification from intake unit 110, the instruction set can comprise command instructions to an API of a communication protocol service to read electronic messages sent by intake unit 110. Alternatively, the instruction set can comprise command instructions to the API of the file server to check for files placed in a preset directory that are designated to hold communications from intake unit 110 to processor 160, as described above. The instruction set can comprise conventional programming instructions to compose a text message having the information provided in the electronic notification from intake unit 110, and to identify, from the electronic notification, the e-mail addresses of the individuals who are to receive the text message. The instruction set can further comprise command instructions to the API of the SMTP communication protocol to send an e-mail to each e-mail address, with the body of the e-mail comprising the text message. The text message and each e-mail address may be stored in a respective string variable when they are generated, and can be passed as variables in a command instruction to the API of the communication protocol. Based on the description of the invention provided herein, it is within the ability of one of ordinary skill in the art to compose these instruction sets.

Also upon completion of the intake process, transcription-logging processor 180 receives notification of at least the recording identifier and/or the file-storage location of the recording's digital version, an indication of whether transcription and/or logging is to be done, and the identity of the party that is to perform the transcription/logging. Processor 180 then generates an e-mail request message to the transcribing party. The request message provides at least the recording identifier and/or the file-storage location of the digital version, and may include the service requested (transcription, logging, or both) if the level of service is not prearranged, and the requested turnaround time (TAT). This part of transcription-logging processor 180 can be implemented in a number of ways. As one straightforward way, it may be implemented in the same straightforward way that processor 160 is implemented to do its notifications (as described immediately above), except that the contents of the text message contains the information that the transcribing party needs, and the e-mail address is that of the transcribing party.

The transcribing party thereafter views the digital version through an access portal 150 or the like, and generates a data file that has transcribed dialog and/or logging information. In preferred embodiments, the data file preferably comprises a Microsoft rich-text format document, or the like. Such formats enable the transcribing party to place in the transcription file hyperlinks to specific video and/or audio frames of the digital version. When the transcription is completed, the party sends back a data file for processor 180 to handle. The return of the data file may be accomplished in a number of ways. As one straightforward way, the transcribing party may send the data file to a preset file storage directory (such as on file-storage server 120) by the well-known file-transfer protocol (FTP), and processor 180 may be configured to periodically check this directory for newly added data files. (The file storage device can have an FTP service program running to accept the FTP files.) The name of this file storage directory can be contained in the request e-mail sent by processor 180, or can be prearranged. The filename of the data file may contain the recording identifier so that processor 180 can identify the data file and properly correlate it with the recording, or the recording identifier may be placed inside of the data file and then later read by processor 180 to make the identification. Also, the request e-mail sent by processor 180 may specify the filename for the transcribing party to use. The instruction set to direct processor 180 in these tasks can be very similar to the instruction set used to direct processor 180 to receive information from intake unit 110. The instruction set directs processor 180, such as with the use of command instructions to the API of the file system, to periodically check the file directory for returned data files and to read the filenames and/or contents of newly added data files. Then, standard programming instructions direct processor 180 to determine the recording identifier to which the data file pertains from the filename and/or contents of the data file.

As another way of handling the return of the data file, the transcribing party may send a reply e-mail to processor 180 containing the data file as an e-mail attachment. The recording identifier (or another identifier) is placed in the body of the reply e-mail or in the data file so that processor 180 can correlate the transcription file with the recording. A POP communication-protocol service may be used by the operating system running processor 180 to receive the e-mail and attachment. An instruction set may then direct processor 180 with the use of command instructions to the API of the POP service to read the e-mail, and standard programming instructions direct processor 180 to determine the recording identifier to which the data file pertains from the filename and/or contents of the attached data file.

Once processor 180 receives the data file, it places it in an appropriate file storage location (such as on file-storage server 120) if it has not already been placed there by the transcribing party (such as through the above-described FTP protocol). This can be readily accomplished with a command instruction to the API of the file system to copy the file from one location (e.g., the e-mail attachment) to another location (e.g., a designated place on file-storage server 120).

With that done, transcription-logging processor 180 causes media-library server 130 to update the library record for the recording to include a network link to the transcription data file. This can be accomplished by processor 180 sending a request message to media-library server 130 containing the recording identifier and a network link to the transcription file. The instructions to direct components 180 and 130 in this electronic messaging can be implemented in the same ways as those described above for other electronic messaging. As for updating the library record to include a network link to the transcription data file, the "Instruction Sets to create and update Library Records" of server 130 (FIG. 10) can be augmented to include instructions to update the "Transcript/Log Link" field to include the network link to the transcription data file. The instruction sets can be based on CGI scripts, or other scripts, and can use command instructions to the API of the file systems of the components and to the API of the database that manages the index file(s). Based on the description of the invention provided herein, it is within the ordinary skill of a person in the art to compose these scripts.

Figure 9:
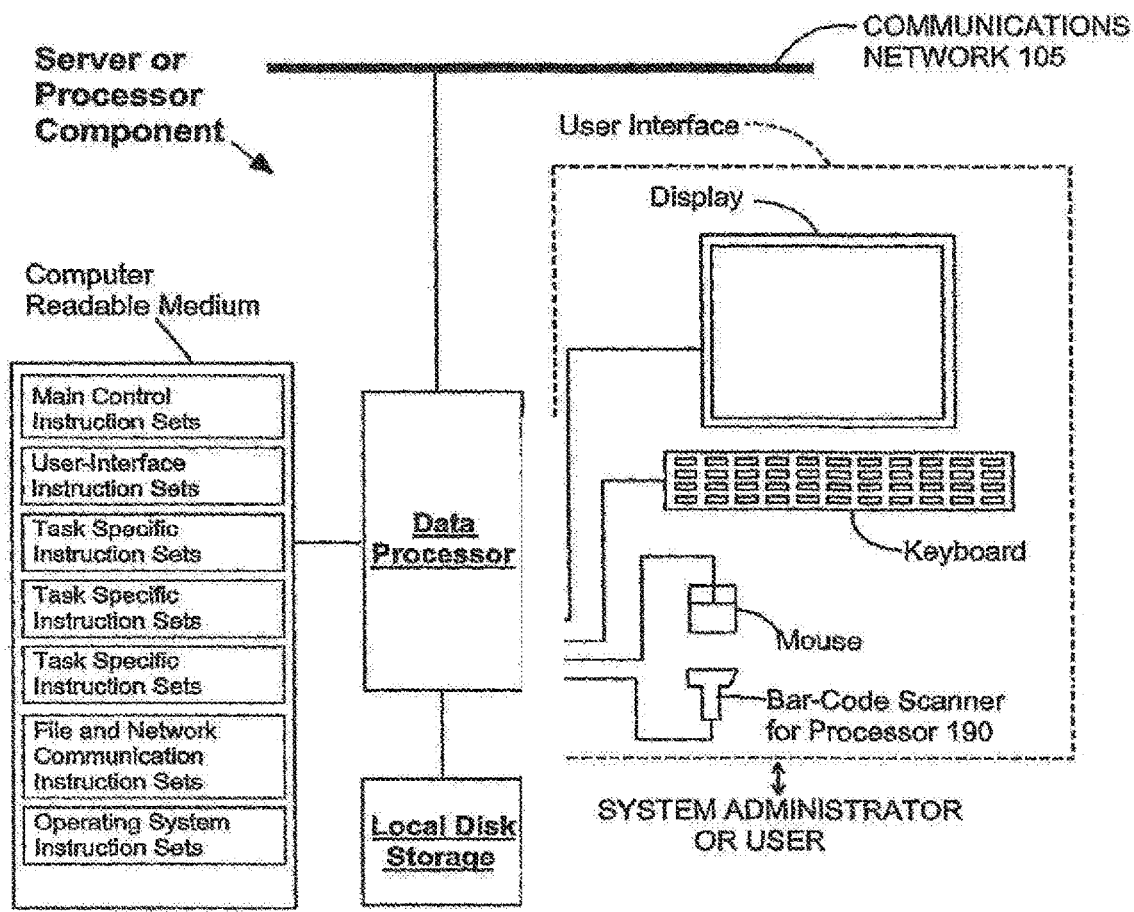
FIG. 9 shows an exemplary embodiment of a component according to the present invention.

Processor 180 may comprise the form shown in FIG. 9, with instruction sets directing its data processor to perform the above-described tasks. Based on the description of the invention provided herein, it is within the ability of one of ordinary skill in the art to compose these instruction sets.

As indicated above, sub-clip processor 140 can be activated after the intake process to divide the digital version of the recording into sub-clips based on selectable criteria, and then to store each sub-clip as a separate file. The digital version is preferably retained in its original, full form. The sub-clips can be stored in file-storage server 120. Typically, the filename for each sub-clip comprises the recording identifier (just as the main digital version preferably does), and includes a suffix identifier that is unique to the sub-clip. The suffix may comprise a numeric index (such as ".sub.-001," ".sub.-002," etc.), an alpha index (such as "_A," "_B," etc.), or an alphanumeric index (such as "_A1," "_A2," etc.). Three such sub-clips with corresponding network links are shown in the library record of FIG. 4A. Once sub-clip processor 140 has generated the sub-clip files, it can send a message to media-library server 130 informing it of the names of the sub-clip files, and other optical information, such as the criteria used to define the sub-clip boundaries. As another notification approach, sub-clip processor 140 can place the sub-clip files in a prearranged file directory, and media-library server 130 can periodically check the file directory for newly added files, and associate the new sub-clips to the appropriate library record by parsing the sub-clip filename for the recording identifier. In either event, media-library server 130 then updates the library record for the recording to include a listing of the sub-clips and corresponding hyperlinks. The instruction sets for these tasks (which are part of "Instruction Sets to create and update Library Records" shown in FIG. 10) can be implemented in the same way as the instruction sets used to update the library record with a network link to the transcription data file, as described above. Based on the description of the invention provided herein, it is within the ordinary skill of a person in the art to compose these scripts.

The above-described tasks done by sub-clip processor 140 can be readily implemented with instruction sets that direct the operations of the data processor of processor 140 to perform those tasks (see FIG. 9 for a general configuration of processor 140).

As we described before, access to the library records (e.g., as shown in FIG. 4A) of the media assets may be provided to the user by way of the exemplary main access web page shown in FIG. 5A. The main access web page is generated by media-library server 130, and conveyed to a portal 150 via communications network 105 to view. The user requests the main access page by typing in the network address (e.g., Universal Resource Locator, or URL) into the address box of the browser running on the portal 150. As an example, the network may take the form of: "www.theProductionCompany.com/BigCityTrip/ThirdEpisode.html." The main access web page comprises the title of the project, current news concerning the project, and the current date. The project title and news section are configured by a system administrator (a user having special privileges in configuring the system). The news section may comprise hyperlinks to other web pages managed by media library server 130 or other resources of system 100, such as the day's message from the chief producer, the schedule of shooting for the day, and the day's e-daily, which generally comprises a listing of recent additions of media assets to the library. The exemplary main access web page further comprises a listing of media assets to select from (typically listing a preset number of the most recently added, or all of the media assets when the total is less than the preset number). The listing provides the Recording Identifier, the Segment Title, and the Shoot Date of the media asset, with a hyperlink on the Recording Identifier that pulls up the library record (FIG. 4A) of the media asset when a user clicks on it. The listing is generated by accessing the database to find a preset number of the most recently added media assets, which may be accomplished by the instruction sets described above (e.g., CGI scripts that interact with the database of library records). At the top of the listing there is an indication ("Selection Criteria:") that indicates the criteria used in selecting the library records that are displayed. In this case, it is the most recently added records to the library. If the number of library records is greater than the preset number for display, then the listing includes a hyperlink ("More . . . ") that brings up an expanded version of the web page with the next group of most recently-added library records.

The main access web page shown in FIG. 5A also comprises a search box to allow a user to search the library records of the media assets by keywords, such as "Java cafe," "shopping," and "promenade." When a user initiates such a search, the user's browser sends back a request to media-library server 130 to conduct the search. Media-library server 130 conducts the search (as described above), and sends back a modified main web page in which the listing of media assets contains the library records that match the user's search criteria. Such a modified page is shown in FIG. 5B, which was generated in response to a user entering the keyword "promenade" in the search box. In the modified web page, the field indicating the present selection criteria has been changed to "promenade," and a hyperlink has been added after the new selection criteria to enable the user to return to a listing of most recently-added media assets.

In addition, the main access page shown in FIG. 5A comprises hyperlinks (referred to as "view links" herein) to additional web pages that list the media assets by Segment Title, Tape Name, Status, Bar Code, and Schedule.

Referring to FIG. 10, media-library server 130 comprises "Instruction Sets to present and edit Main Access Page" that direct data processor 132 to perform the above tasks. These instruction sets may be composed from common-gateway interface (CGI) scripts or common programming languages, such as C++, Java, Visual Basic, etc., with appropriate command instructions to the APIs of the file system and database for the library records. Based on the description of the invention provided herein, it is within the ability of one of ordinary skill in the art to compose the above-described instruction sets.

Conventional internet security protocols, such as secure-socket interface and public-key interface protocols, may be added to system 100 to safeguard the electronic communications among components 110-190.

To illustrate the benefits and advantages that system 100 and its related processes bring to the production environment, we first describe the work flow of the current production environment for reality TV shows, and then describe the new work flows provided by system 100 and its related processes.

Figure 6:
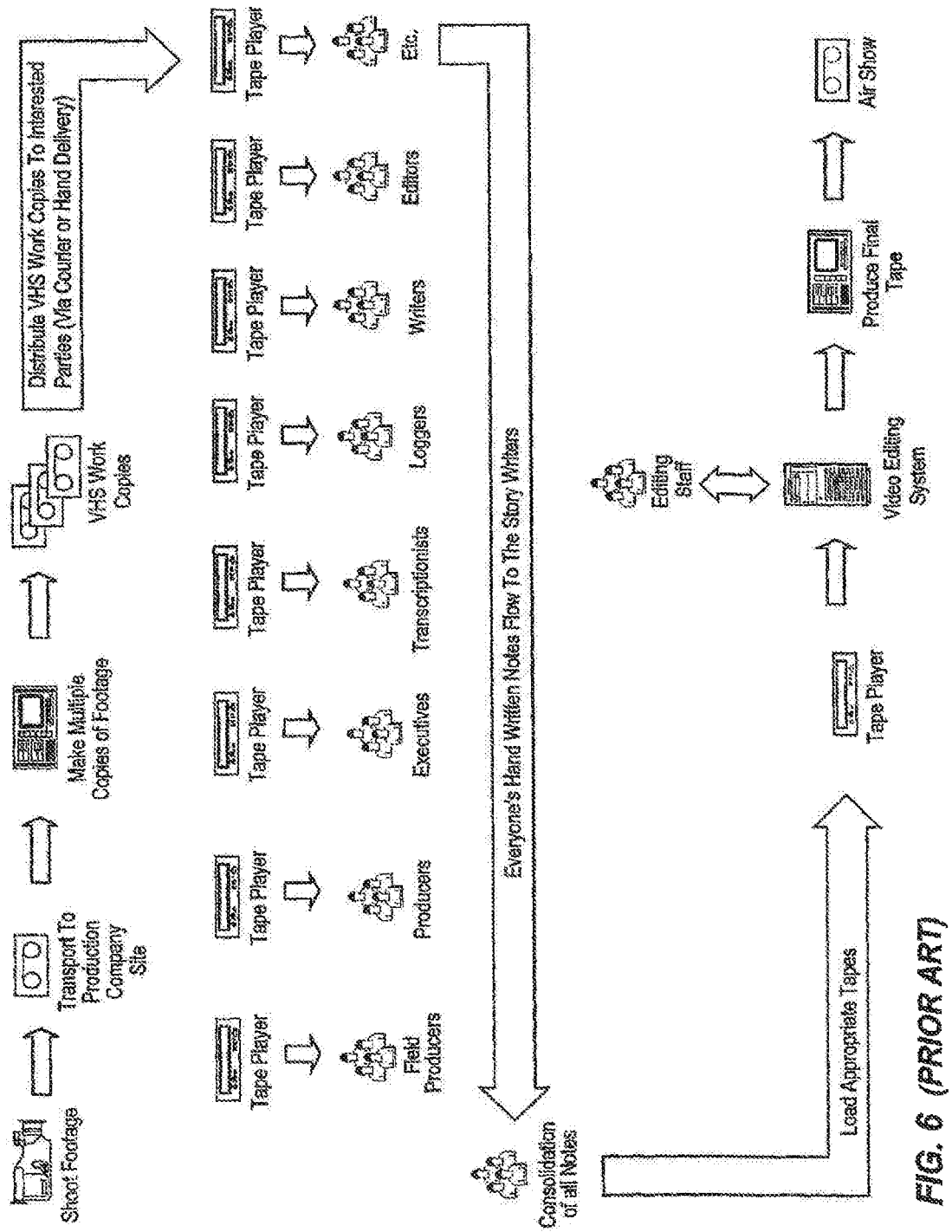
FIG. 6 illustrates the work flow of a typical production environment according to the prior art.

FIG. 6 illustrates the current production environment. The production of a network reality TV show typically involves booking hundreds of stories, sending field crews out to shoot each story. The Beta SP or DV tapes generated by the field crews are sent by courier back to the production site, where a postproduction team duplicates the original tapes to VHS work copies. Several work copies of each original Beta SP or DV tape are made for distribution to field producers, producers, executives, transcriptionists, loggers, writers, editors, and other production staff. The original Beta SP or DV tapes are stored for later use in the final editing stage. The loggers and transcriptionists begin immediately to summarize the action and transcribe the dialog on each tape, so that the storywriters, editors, executives, and producers can identify tapes that may have compelling story points, and start sketching out one or more storyboards for the reality TV show. Once these tapes are identified, they are reviewed by the storywriters, directors, executives, field producers, and producers on VHS tape players to refine the story points and storyboards. The storywriters and creative directors build the storyboard, sending the transcriptions to the editors to cut and piece together. During this time, editors, executives, field producers, and producers generate a considerable volume of notes to the storywriters and creative directors as part of the process of developing the final storyboard for the reality TV show. The notes are consolidated, the storyboard is finalized, and the pertinent scenes are identified. The original tapes containing the pertinent scenes are collected, sent to the video editing staff to be digitized, and then entered into a video editing system, such as the Apple Final Cut or AVID Unity video editing system. Using the video editing system, and working under the direction of key executives, producers, storywriters, and creative directors, the editing staff pieces the scenes together into a whole, adds sound tracks, music, and artwork, and generates a tape of the complete show, which is then aired at the scheduled time.

Coordinating all of these activities is significantly time-consuming and expensive. Typically, generating the VHS work copies is the most expensive and time-consuming element. It involves several staff, expensive equipment, thousands of VHS cassettes, and many hours, since the duplication of each tape is done at the normal tape-playing rate (1.times.), thereby slowing the postproduction process. The large volume of video tapes creates several bottlenecks in the work flow. Creating the VHS work copies, of course, is a major bottleneck. Transcription and logging of a large number of tapes also pose major bottlenecks to the process since the identification of story points and building of storyboards is often based on reviewing logs and transcripts and piecing together cut-up transcripts. To address this bottleneck, the VHS work copies are rush-delivered to local transcriptionists and loggers at great expense. Once the transcripts are made, there are further bottlenecks in identifying and sharing the transcripts and logs for discussion between the storywriters and other production personnel. The multiple VHS work copies take up a large amount of storage space and require a large amount of staff time to manage the checking in and checking out of the tapes. With the large volume of tapes, the efforts of the production staffers often interfere and hinder the ability for the crew to efficiently coordinate and manage the distribution of the VHS work copies, thereby creating both a management bottleneck and opportunities for error. Additionally, there are the expenses of handling and storing the massive tape libraries, providing high-end tape players (edit decks) and desktop logging systems, managing the logging and transcription processes, and dealing with multiple vendors. There is a lack of effective writing tools which impedes creative productivity, and an inability of the production staff to work remotely (away from the production site). The difficulty and costs of the present production approach threaten deadlines and budgets, and further impede productivity.

Figure 7:
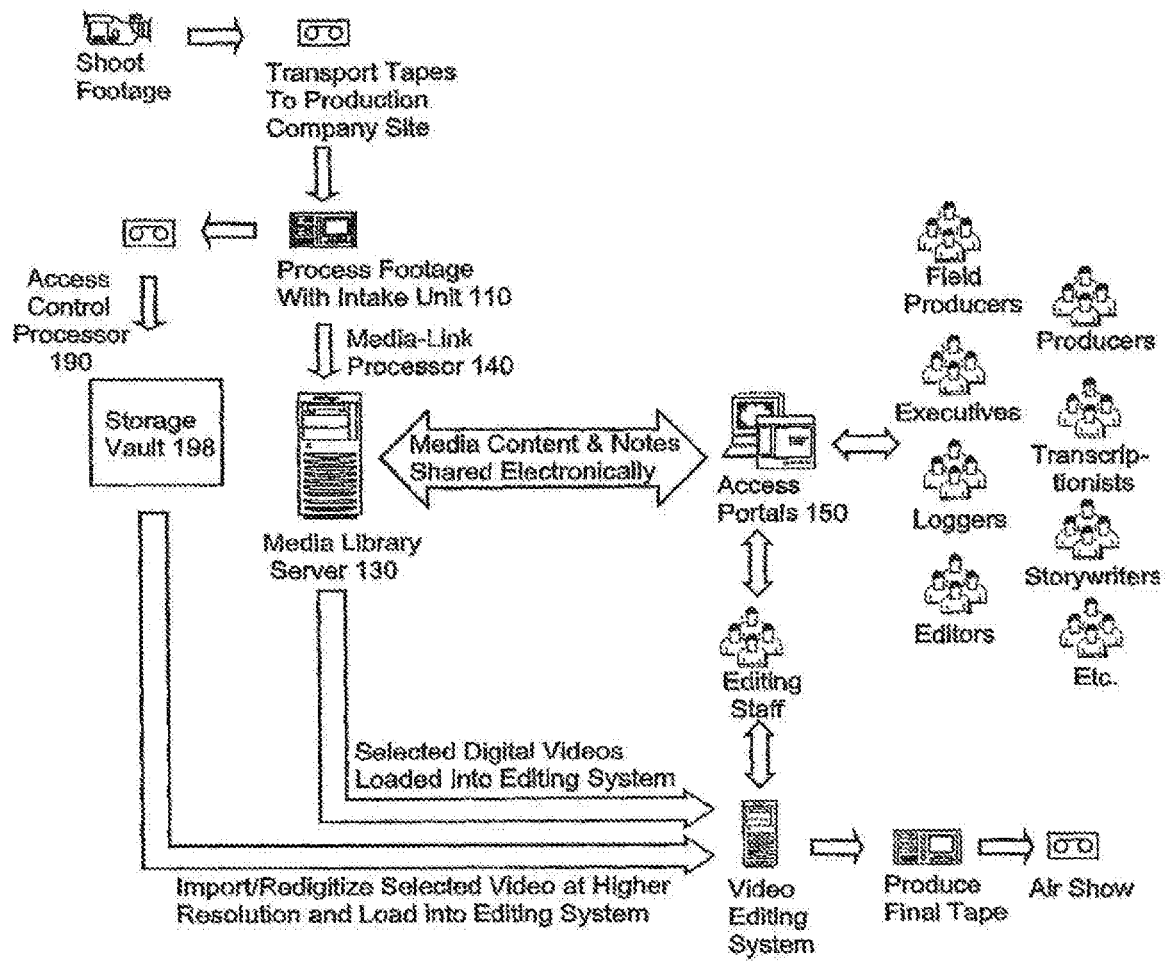
FIG. 7 illustrates the work flow of an exemplary production environment according to the present invention.

Referring to FIG. 7, when using system 100 and its related processes in an exemplary production environment, camera footage is shot, usually at various locations, and the resulting original tapes sent to intake unit 110 for processing. There can be more than one instance of intake unit 110, and there is usually at least one intake unit 110 at the company production site. The tapes are processed by intake unit 110, and corresponding digital versions are stored on file storage server 120 and corresponding library records are created by media-library server 130. As an advantage, an instance of intake unit 110 may be located at a shooting site that is remote from the company production site, and the digital version and notification messages may be transmitted by satellite or through the internet to the company production site (i.e., to the other components of system 100). Each original tape need only be played once, which is far less time consuming than the duplication process of generating VHS work copies, and which eliminates the VHS-duplication bottleneck. The tapes processed by intake unit 110 are then processed by access-control processor 190 and sent to storage vault 198 for safekeeping. E-mail notifications are then sent to selected users as each tape is processed by intake unit 110, and the users can then instantly view the digital version on their access portals 150 without having to wait for VHS-work copies to be made and delivered to them. This eliminates the management bottleneck in managing and delivering the work copies that is present in the prior art work flow. Also, after the intake process is completed, the request for the transcription and/or log is quickly sent to the transcribing party by e-mail. Some of the transcribing parties may be located in other time zones to enable transcriptions to be done overnight and ready for the next morning. This is generally not possible in the prior art work flow approach since a VHS work copy has to be generated and then physically transported to a local company. As each transcript/log is completed, it is quickly uploaded onto media-library server 130, and storywriters, directors, executives, field producers, and producers can be notified immediately, and start their review of the record. Media-library server 130 provides an efficient way for the users to manage and review the recordings, and to share information by attaching files to the library web pages. In addition, notes and information can be exchanged between users by e-mail, and users can copy network links to relevant tapes, sub-clips, transcripts, and logs into their e-mails for fast and efficient sharing of ideas and information. The storywriters can compose storyboards electronically and store them on file-storage server 120 for other users to view. Once the final storyboard is completed, the pertinent scenes from the tapes can be directly loaded into the video editing system directly from media-library server 130 (or the original tapes can pulled from storage vault 198 and reimported or redigitized at a higher resolution and input into the video editing system).

In addition to the above advantages, system 100 eliminates the need for providing users with high-end tape-playing decks (e.g., edit decks) since access portals 150 eliminate the need for the playing decks and since the computers that the users already have can be used to implement the access portals 150. In addition, the digital versions can be provided to the access portals in a manner that prevents copying, thereby greatly improving security.

According, the present-invention provides an integrated end-to-end solution for production companies to bridge the gap between the shooting of footage and the final storyboard editing with digital workflow solutions that eliminate waste, improve production efficiency, and reduce production costs.

While the present inventions have been particularly described with respect to the illustrated embodiments, it will be appreciated that various alterations, modifications and adaptations may be made based on the present disclosure, and are intended to be within the scope of the present inventions. While the inventions have been described in connection with what are presently considered to be the most practical and preferred embodiments, it is to be understood that the present inventions are not limited to the disclosed embodiments but, on the contrary, is intended to cover various modifications and equivalent arrangements included within the scope of the appended claims.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:

a data source of media assets; and a processor configured to execute instruction sets to perform operations including to:

receiving a reply e-mail with a transcription data file attached and a recording identifier in a body of the e-mail, the recording identifier being associated with a recording;

determining a recording identifier associated with the transcription data file from the reply e-mail;

responsive to verifying that the transcription data file is not stored on a storage server, storing the transcription data file on the storage server; and updating a library record corresponding to the recording with a network link to the transcription data file.

* * * * *